(12) United States Patent
Sagara et al.

(10) Patent No.: US 8,253,284 B2
(45) Date of Patent: Aug. 28, 2012

(54) ELECTRIC MOTOR AND ELECTRIC MOTOR VEHICLE

(75) Inventors: Hiroaki Sagara, Kasai (JP); Kenji Taguchi, Hirakata (JP); Tetsuji Ueta, Hirakata (JP); Takeshi Nagao, Hirakata (JP); Takashi Uchino, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 179 days.

(21) Appl. No.: 12/767,458

(22) Filed: Apr. 26, 2010

(65) Prior Publication Data
US 2010/0270093 A1 Oct. 28, 2010

(30) Foreign Application Priority Data
Apr. 27, 2009 (JP) ................................ 2009-108364

(51) Int. Cl.
*H02K 1/04* (2006.01)
(52) U.S. Cl. ...... 310/43; 310/68 B; 310/67 R; 310/68 C
(58) Field of Classification Search .................... 310/43, 310/68 B, 67 R, 68 C
See application file for complete search history.

(56) References Cited

U.S. PATENT DOCUMENTS

| 7,057,317 | B2 * | 6/2006 | Kuwert | 310/89 |
| 2001/0033111 | A1 * | 10/2001 | Choi | 310/43 |
| 2007/0222305 | A1 * | 9/2007 | Takada | 310/43 |

FOREIGN PATENT DOCUMENTS

JP 2005-027478 A 1/2005

* cited by examiner

*Primary Examiner* — Quyen Leung
*Assistant Examiner* — Leda Pham
(74) *Attorney, Agent, or Firm* — Marvin A. Motsenbocker; Mots Law, PLLC

(57) ABSTRACT

An electric motor includes: a stator of columnar shape including a stator core of annular shape and mold resin molding the stator core, the stator core accommodating a rotor configured to rotate about a rotary shaft; and a position detecting circuit board including a position detecting element configured to detect a position of the rotor. The stator has a cavity for accommodating the rotor. One end of the cavity is covered by the mold resin. The position detecting circuit board is placed on an opposite side from the rotor across the mold resin covering the one end of the cavity.

6 Claims, 14 Drawing Sheets

ELECTRIC MOTOR AND ELECTRIC MOTOR VEHICLE

CROSS REFERENCE TO RELATED APPLICATIONS

This application is based upon and claims the benefit of priority from prior Japanese Patent Application No. 2009-108364, filed on Apr. 27, 2009; the entire contents of which are incorporated herein by reference.

BACKGROUND OF THE INVENTION

1. Field of the Invention

The present invention relates to an electric motor including mold resin molded on a stator core and to an electric motor vehicle.

2. Description of the Related Art

There has been known an electric motor including a case which accommodates a stator core, coils and a rotor. In the electric motor, the polarity of the coil is repeatedly reversed to cause the rotor, which is provided inward of the stator core in a radial direction thereof, to rotate about a rotary shaft of the rotor. Meanwhile, such electric motor is used as a power source for an electric motor vehicle, for example.

There has been proposed a technique to improve radiation of heat transmitted from the coils provided to the stator core. In the technique, mold resin is filled into a case with the stator core mounted therein.

In addition, there has been proposed a technique to detect the position (rotation) of a rotor in an electric motor in which mold resin molds a stator core (e.g., Japanese Patent Application Publication No. 2005-27478). According to the technique, the electric motor is provided with position detecting elements (such as Hall elements) configured to detect the magnetic fields of a magnet provided to the rotor. Specifically, an electrical motor has been proposed which includes: a stator molded in a hollow cylindrical shape with mold resin; a position detecting circuit board provided on top of one end surface of the stator; and the position detecting elements provided on a surface of the position detecting circuit board facing the hollow portion of the stator.

As described above, the position detecting elements are provided on the surface of the position detecting circuit board facing the hollow portion of the stator. Thus, the position detecting elements may possibly be damaged by lubricating oil or the like from the rotor side.

SUMMARY OF THE INVENTION

An electric motor according to a first aspect includes: a stator (stator 20) of columnar shape including a stator core (stator core 70) of annular shape and mold resin (mold resin 20A) molding the stator core, the stator core accommodating a rotor (rotor 80) configured to rotate about a rotary shaft; and a position detecting circuit board (position detecting circuit board 140) including a position detecting element (position detecting element 141) configured to detect a position of the rotor. The stator has a cavity for accommodating the rotor. One end of the cavity is covered by the mold resin. The position detecting circuit board is placed on an opposite side from the rotor across the mold resin covering the one end of the cavity.

In the first aspect, the electric motor further includes a case (case 10) which accommodates the stator molded by the mold resin. The mold resin covering the one end of the cavity has an exposed portion (exposed portion 20B) exposed from an opening provided in the case. The position detecting circuit board is provided on the exposed portion.

In the first aspect, the exposed portion has a circuit-board placement portion (circuit-board placement portion 21) to place the position detecting circuit board, and an adjacent portion (adjacent portion 22) adjacent to the circuit-board placement portion. The thickness of the circuit-board placement portion is thinner than the thickness of the adjacent portion in a direction of the rotary shaft. A space to place the position detecting element is formed between the position detecting circuit board and the circuit-board placement portion.

In the first, the case includes a recessed portion (recessed portion 16B) recessed toward the stator core. A circumferential portion of the position detecting circuit board is sealed on a bottom of the recessed portion.

In the first aspect, the position detecting element detects magnetic fields of rotor magnets (rotor magnets 83) provided around an outer circumferential portion of the rotor.

In the first aspect, the electric motor further includes a position detection magnet (position detection magnet 84) provided adjacently to the rotor in a direction of the rotary shaft. The position detecting element detects a magnetic field of the position detection magnet.

An electric motor vehicle according to second aspect includes the electric motor according to the first aspect.

DETAILED DESCRIPTION OF THE EMBODIMENTS

An electric motor according to embodiments of the present invention will be described below with reference to the drawings. Note that, in the following description of the drawings, same or similar reference signs denote same or similar elements and portions.

It should be noted, however, that the drawings are schematic, and that the dimensional proportions and the like are different from the actual ones. Accordingly, specific dimensions and the like should be inferred based on the description given below. Moreover, the drawings also include portions having different dimensional relationships and ratios from each other.

[Summary of Embodiments]

An electric motor according to embodiments includes: a stator of columnar shape including a stator core of annular shape and mold resin molding the stator core, the stator core accommodating a rotor configured to rotate about a rotary shaft; and a position detecting circuit board including a position detecting element configured to detect a position of the rotor. The stator has a cavity for accommodating the rotor. One end of the cavity is covered by the mold resin. The position detecting circuit board is placed on an opposite side from the rotor across the mold resin covering the one end of the cavity.

According to the embodiments, the position detecting circuit board provided with the position detecting element is placed on the opposite side from the rotor across the mold resin covering the one end of the cavity. Therefore, it is possible to prevent the position detecting elements 141 from being damaged by lubricating oil or the like.

[Embodiment 1]

(Structure of Electric Motor)

Figure 1:
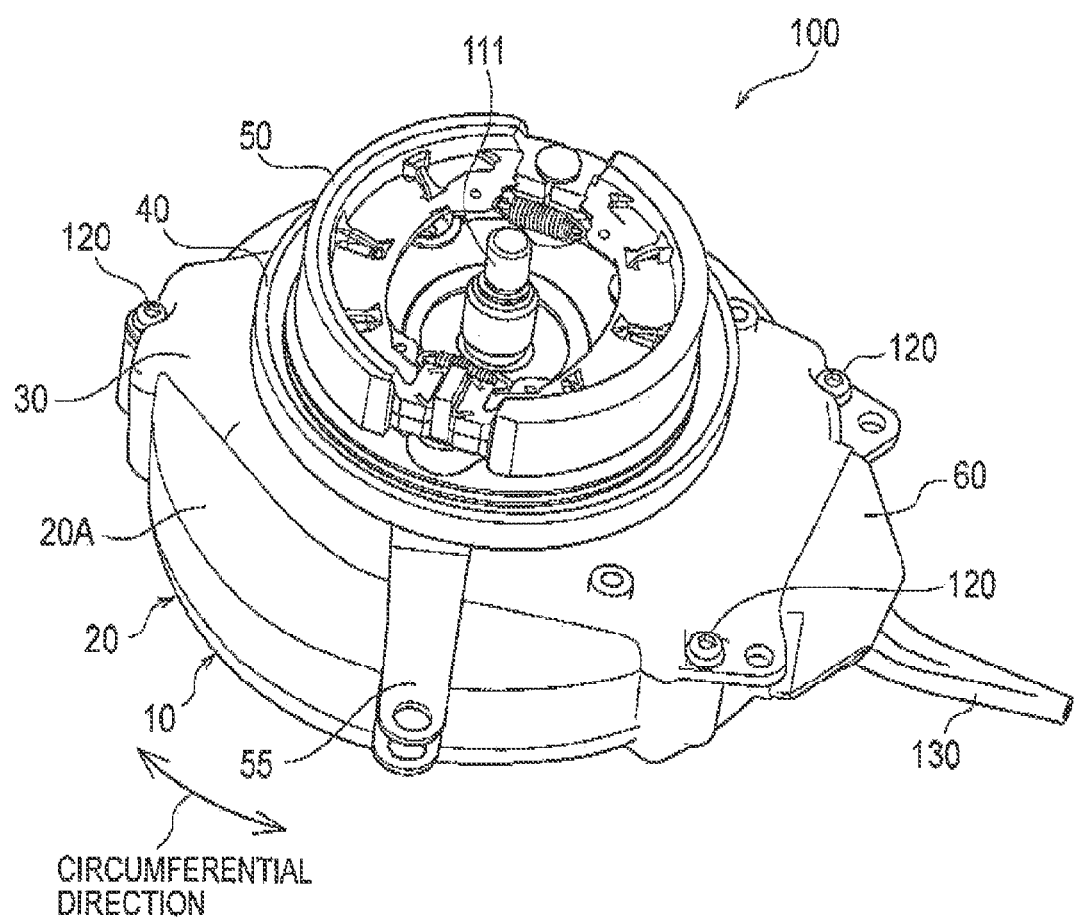
FIG. 1 is a perspective view showing an electric motor 100 according to Embodiment 1.
Figure 2:
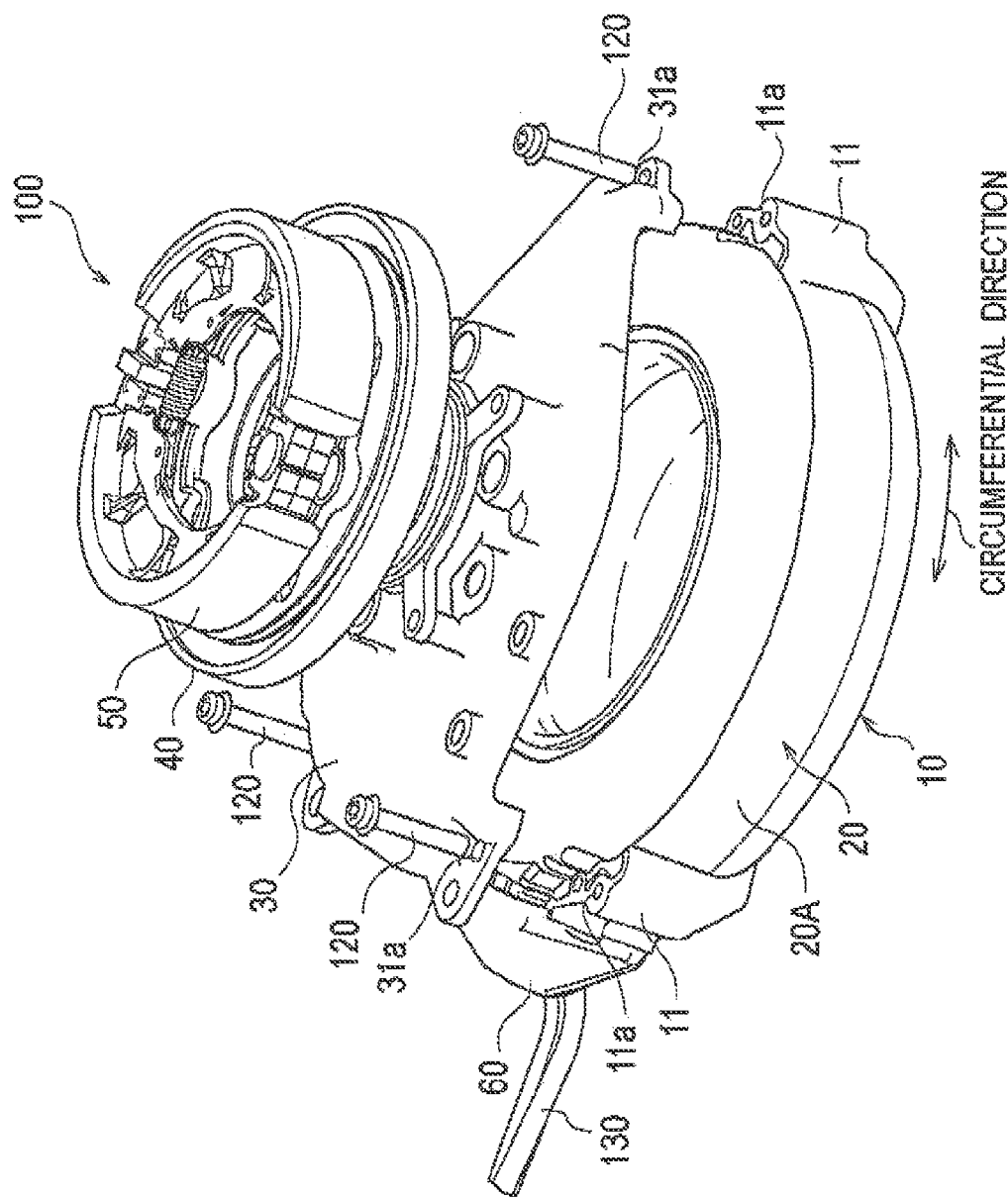
FIG. 2 is an exploded perspective view showing the electric motor 100 according to Embodiment 1.
Figure 3:
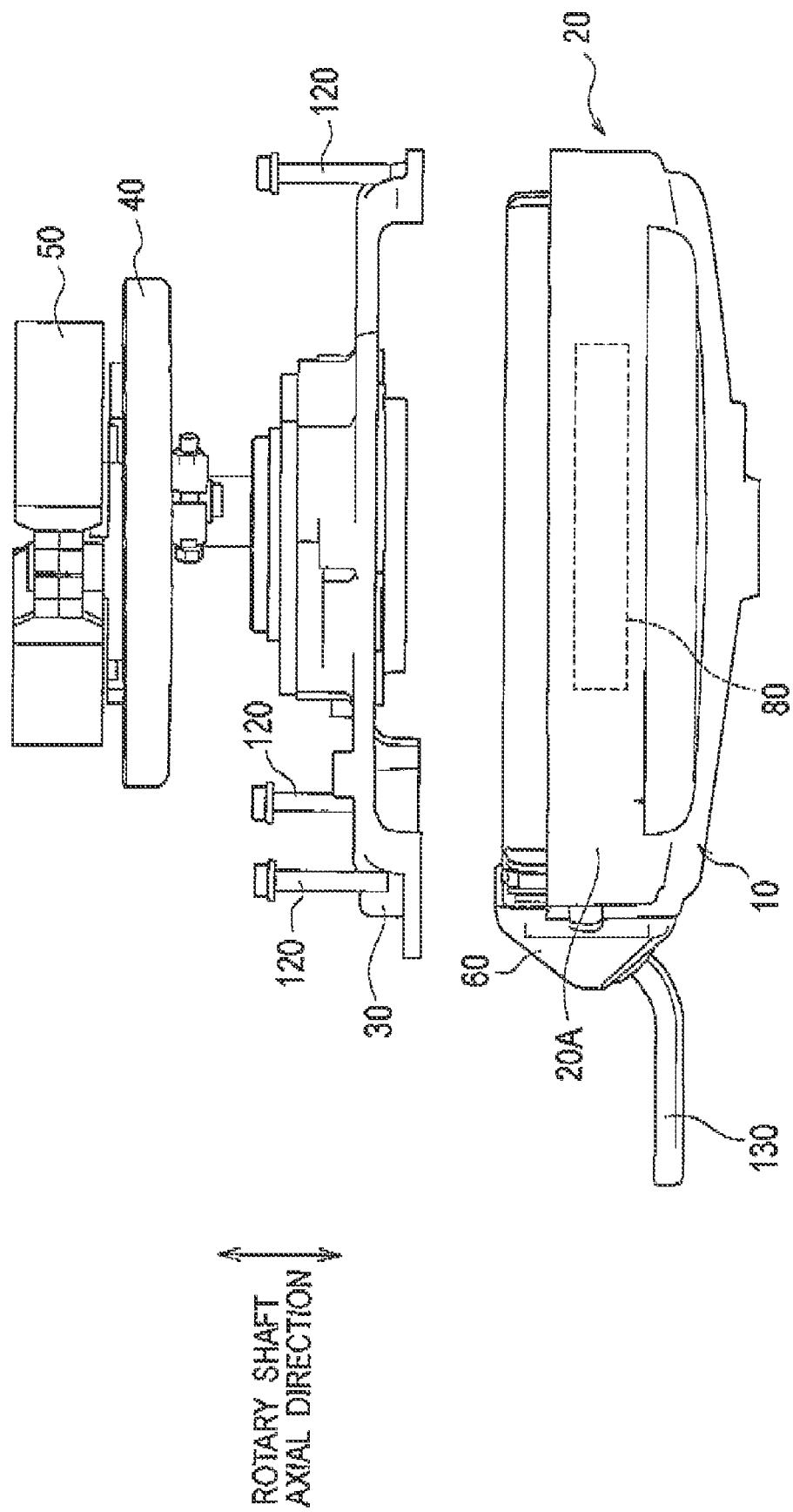
FIG. 3 is an exploded view showing the electric motor 100 according to Embodiment 1.

An electric motor according to Embodiment 1 will be described below with reference to the drawings. FIG. 1 is a perspective view showing an electric motor 100 according to Embodiment 1. FIG. 2 is an exploded perspective view showing the electric motor 100 according to Embodiment 1. FIG. 3 is an exploded view showing the electric motor 100 according to Embodiment 1.

As shown in FIGS. 1 to 3, the electric motor 100 includes a case 10, a stator 20, a cushioning member 30, a holding member 40, a braking mechanism 50, and a terminal cover 60.

The case 10 accommodates a stator core 70 to be described later (not shown in FIGS. 1 to 3; see FIG. 5). The case 10 is formed of a member having certain stiffness, such as a metal member. The case 10 includes guide ribs 11 each having a bolt hole 11a having a spiral groove. As will be described later, the case 10 has an opening 13 (not shown in FIGS. 1 to 3; see FIG. 4). The case 10 will be described later in detail (see FIG. 4).

The stator 20 is formed of mold resin 20A and the stator core 70. The mold resin 20A molds the stator core 70. The mold resin 20A is also filled into the opening 13 provided on the case 10. The mold resin 20A is made of a thermosetting material. The stator 20 will be described later in detail (see FIG. 6).

The cushioning member 30 is attached to the case 10. The cushioning member 30 has bolt holes 31a which receive bolts 120, respectively. The cushioning member 30 is attached to the case 10 by inserting the bolts 120 into the bolt holes 31a and then screwing the bolts 120 to the bolt holes 11a, respectively. The cushioning member 30 is formed of a member having certain stiffness, such a metal member.

In Embodiment 1, the case 10 forms a lower case which covers a bottom surface side of the stator core 70 whereas the cushioning member 30 forms an upper case which covers a top surface side of the stator core 70.

The holding member 40 holds the braking mechanism 50, and is attached to the cushioning member 30 by tightening bolts or doing the like.

The braking mechanism 50 is configured to control motion of a rotating rotor 80. The braking mechanism 50 includes a brake arm 55, and reduces the rotation of a rotary shaft 111 provided to the rotor 80 in accordance with how much the brake arm 55 pivots (moves). For example, in a case where the electric motor 100 is provided to an electric motor vehicle, the braking mechanism 50 is a drum brake configured to reduce the rotation force of a wheel provided to the electric motor vehicle.

Figure 7:
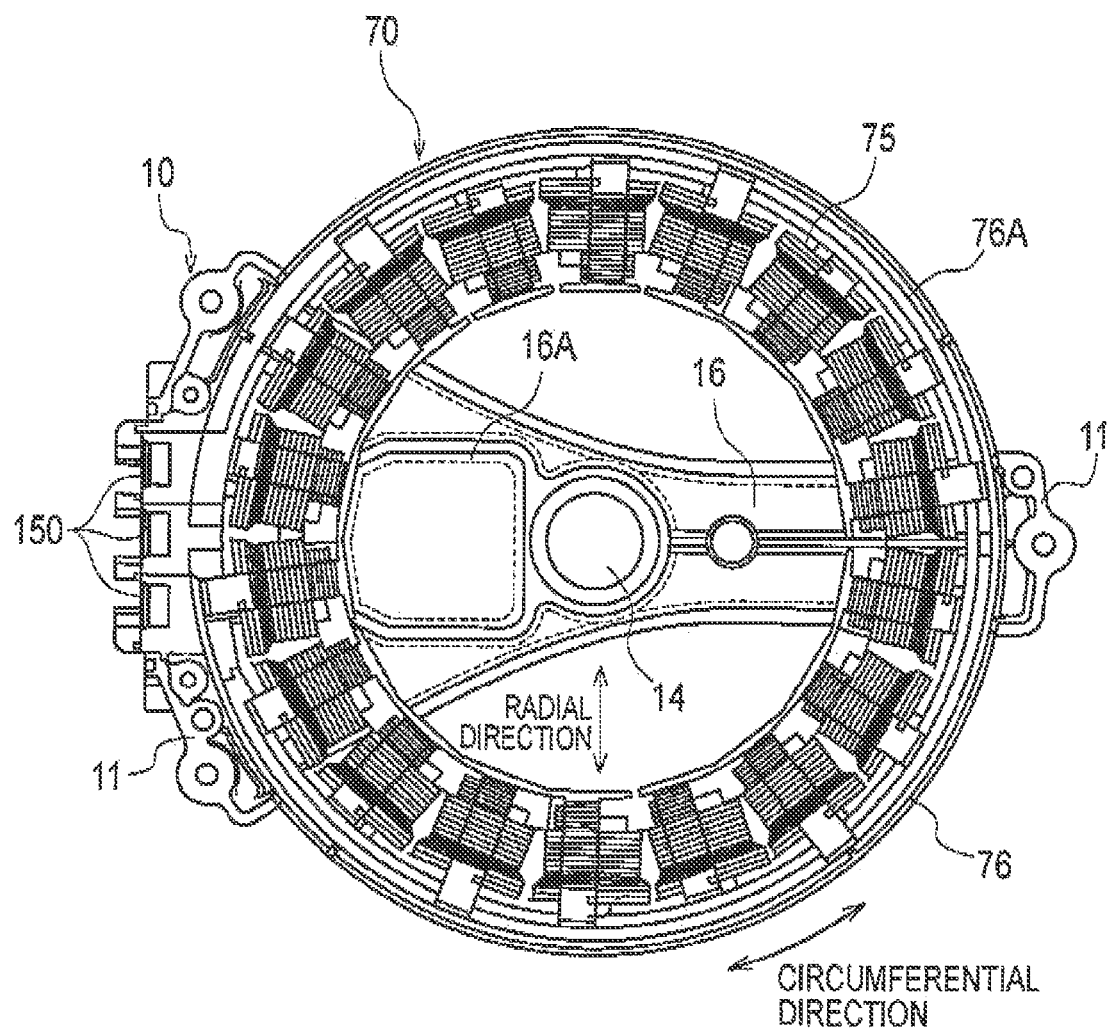
FIG. 7 is a view showing an assembly of the case 10 and the stator core 70 according to Embodiment 1.

The terminal cover 60 protects a connecter provided to one end of each of cables 130 and also terminals 150 to which the connecters are attached (not shown in FIGS. 1 to 3; see FIG. 7).

(Structure of Case)

Figure 4:
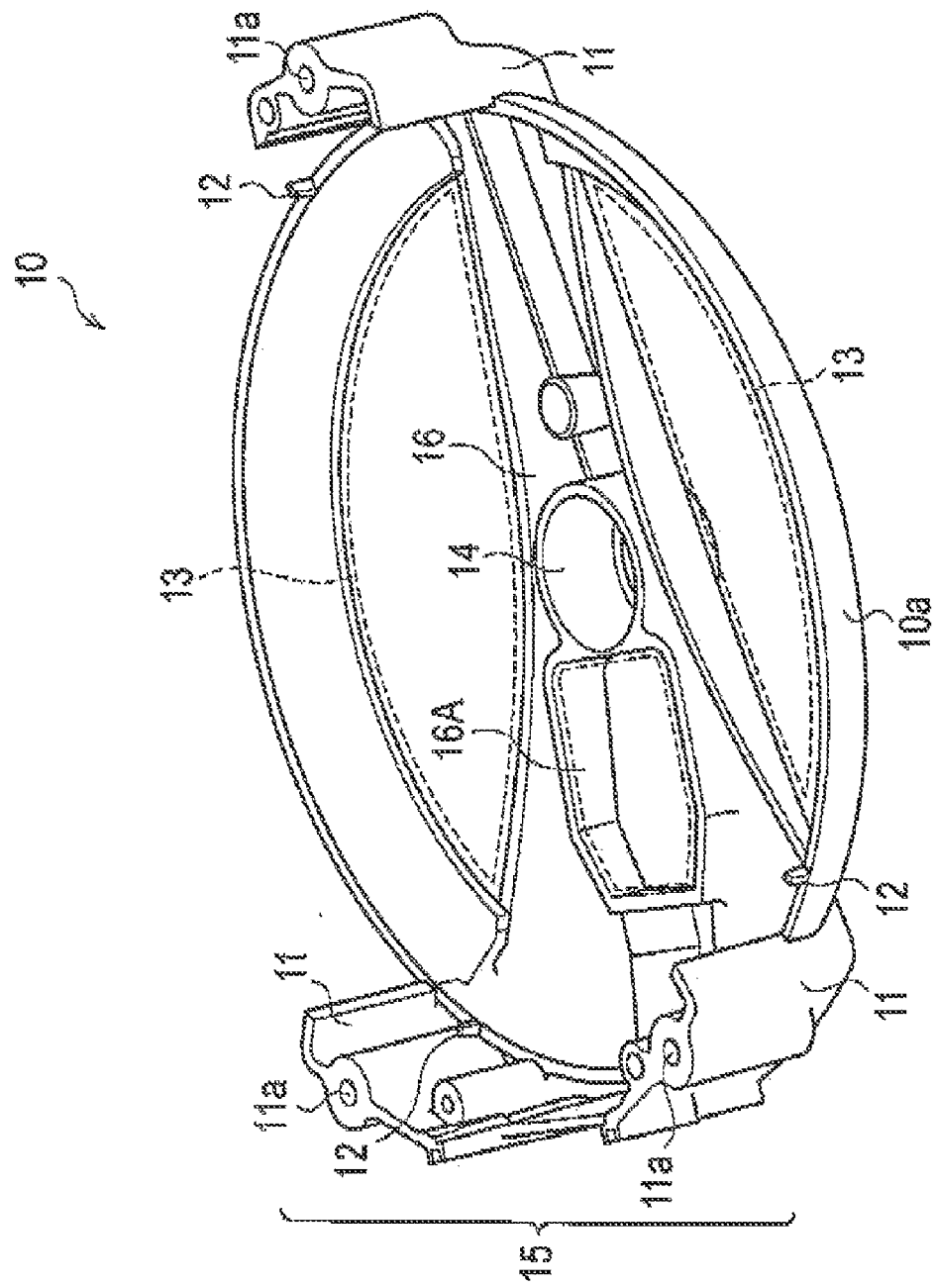
FIG. 4 is a perspective view showing a case 10 according to Embodiment 1.

The structure of the case according to Embodiment 1 will be described below with reference to the drawings. FIG. 4 is a perspective view showing the case 10 according to Embodiment 1.

As shown in FIG. 4, the case 10 includes the guide ribs 11, protrusions 12, the opening 13, a shaft hole 14, a cable leading out region 15, and a bottom surface portion 16.

The guide ribs 11 each have a protruded-shape in an axial direction of the rotary shaft of the rotor 80 (not shown in FIG. 4; see FIG. 3) and are provided around an outer circumferential portion (an outer circumferential portion 73a to be described later) of the stator core 70 (not shown in FIG. 4; see FIG. 5) to be described later. As described above, the guide ribs 11 have the bolt holes 11a in which the bolts 120 are screwed, respectively.

The protrusions 12 each have a shape protruded from a contact portion 10a which comes into contact with a portion on the bottom surface of the stator core 70.

As described above, the mold resin 20A (shown in FIG. 4; see FIGS. 1 to 3) is filled into the opening 13. In Embodiment 1, the mold resin 20A molded on the stator core 70 is exposed from the opening 13.

The shaft hole 14 receives the rotary shaft 111, which is provided to the rotor 80, together with a bearing mechanism such as a ball bearing (not shown).

The cable lead out region 15 includes the terminals 150 to terminate the cables 130 (not shown in FIG. 4; see FIGS. 1 to 3).

The bottom surface portion 16 covers at least partially the mold resin 20A from a bottom surface (a bottom surface 25 to be described later) of the stator 20. The bottom surface portion 16 has a circuit-board placement region 16A. The circuit-board placement region 16A is a region to place a position detecting circuit board 140 (not shown in FIG. 4; see FIGS. 9 to 11, etc.) configured to detect the position of the rotor 80 (not shown in FIG. 4; see FIG. 3). Here, the circuit-board placement region 16A is an opening.

In Embodiment 1, the bottom surface portion 16 has a strip shape extending over the shaft hole 14. The shape of the bottom surface portion 16, however, is not limited to such shape. For example, the bottom surface portion 16 may have such a shape as to entirely cover the bottom surface (the bottom surface 23 to be described later) of the stator 20.

(Structure of Stator Core)

The structure of the stator core 70 according to Embodiment 1 will be described below with reference to the drawings. FIG. 5 is a plan view showing the stator core 70 according to Embodiment 1.

Figure 5:
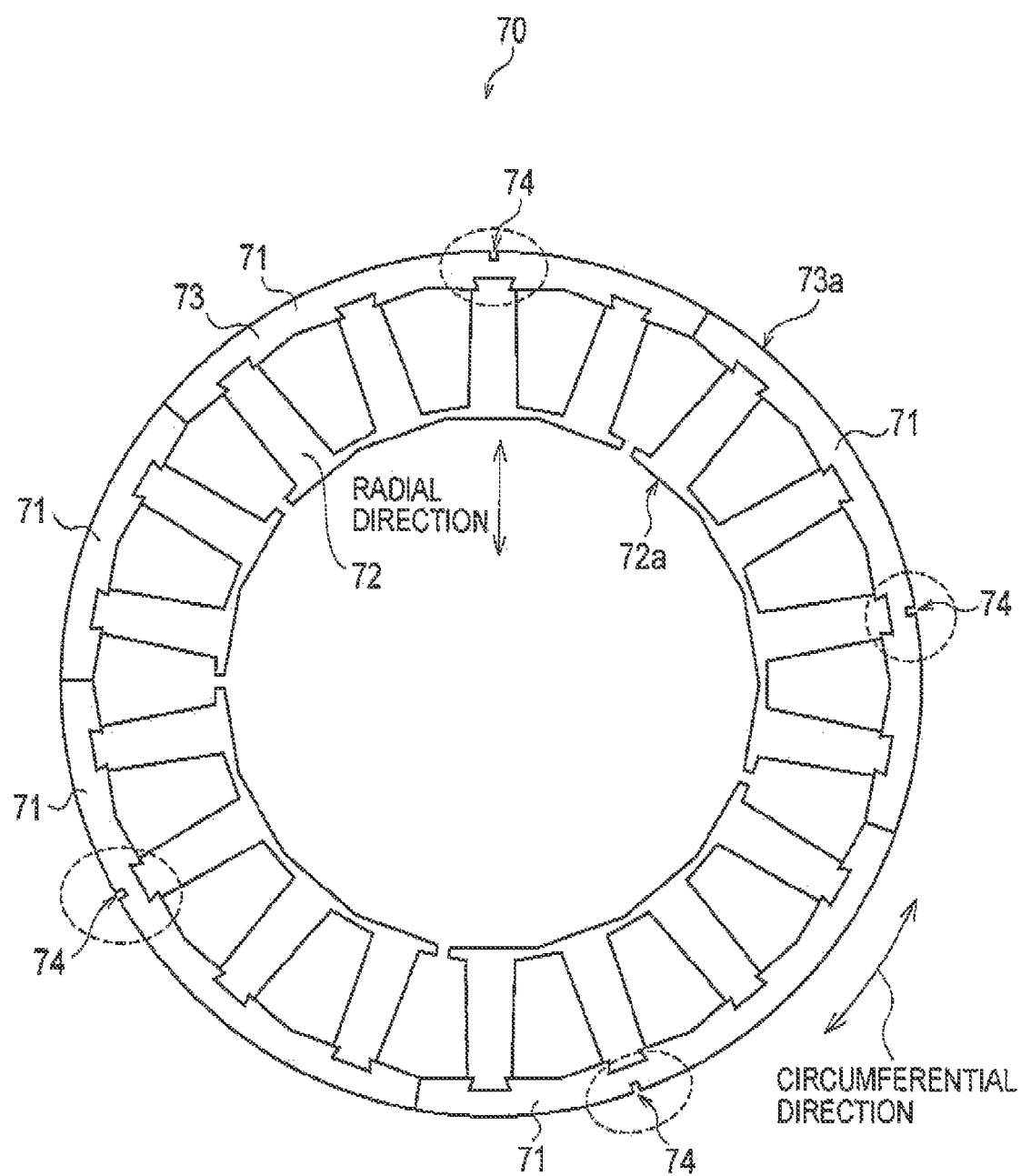
FIG. 5 is a plan view showing a stator core 70 according to Embodiment 1.

As shown in FIG. 5, the stator core 70 has an annular shape. The rotor 80 (not shown in FIG. 5; see FIG. 3) is placed inward of the stator core 70 in a radial direction thereof. To be more specific, the stator core 70 has stator yokes 73 which form an annular shape, and stator teeth 72 protruded inwardly in the radial direction from inner circumferential portions of the stator yokes 73. The stator core 70 is formed of multiple stator core segments 71.

Each of the stator teeth 72 has an insulator 76 (not shown in FIG. 5; see FIGS. 8 to 10) mounted thereon. The insulator 76 has the coil 75 to be described later (not shown in FIG. 5; see FIGS. 8 to 10) wounded around the insulator 76.

An end portion 72a of each stator tooth 72 has a hollow formed therein in a substantially columnar shape, for example. The outer circumferential portions 73a of some of the stator yokes 73 have grooves 74 which are to be engaged with the protrusions 12, respectively.

(Structure of Stator)

Figure 6A:
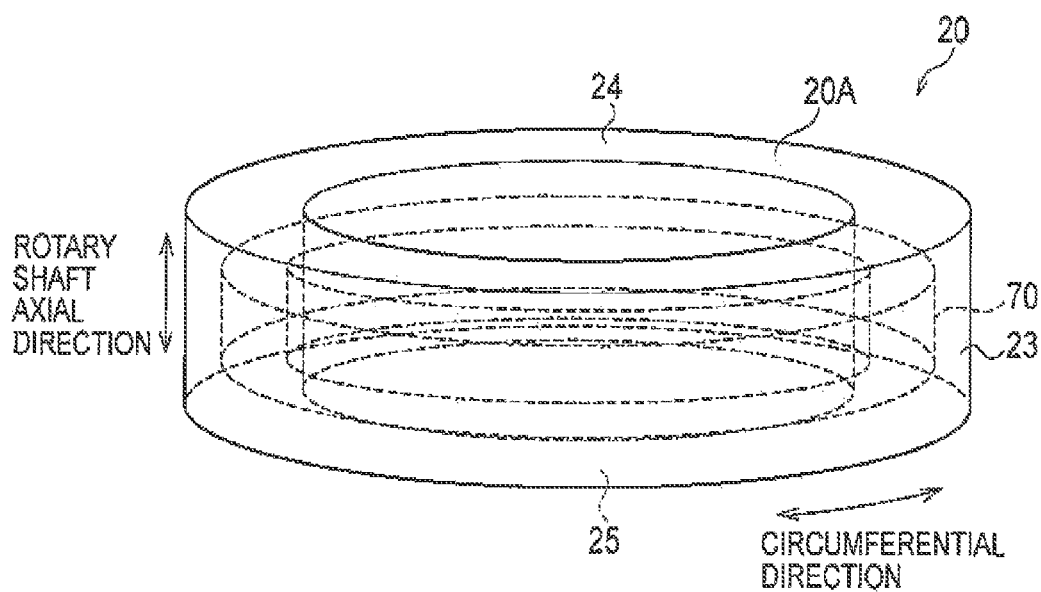
FIGS. 6A and 6B are views each showing a stator 20 according to Embodiment 1.
Figure 6B:
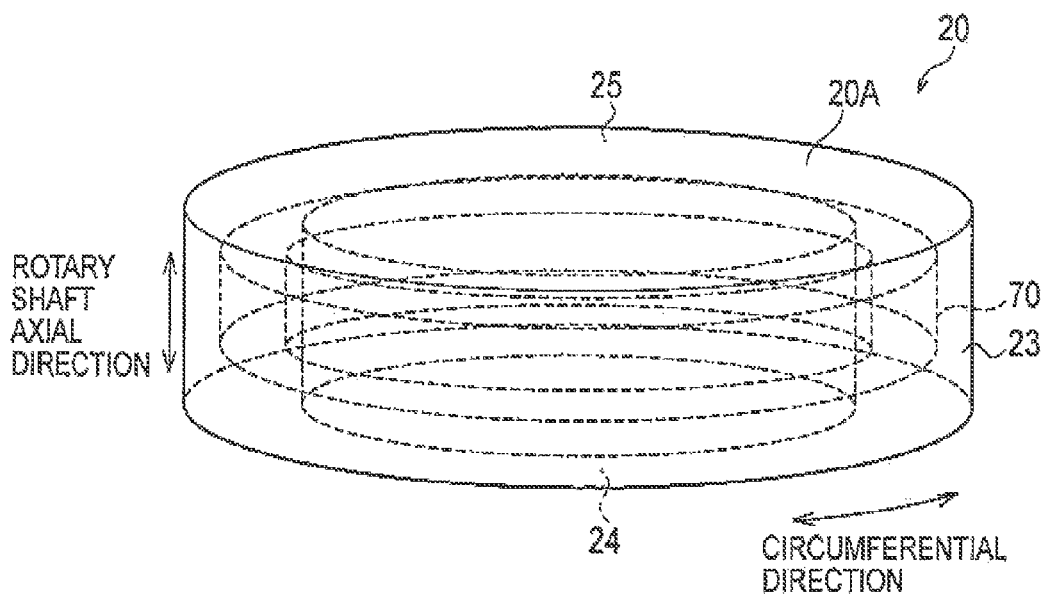

The structure of the stator according to Embodiment 1 will be described below with reference to the drawings. FIGS. 6A and 6B are diagrams each showing the stator 20 according to Embodiment 1. Specifically, FIG. 6A is a perspective diagram showing the top surface of the stator 20, and FIG. 6B is a perspective diagram showing the bottom surface of the stator 20.

As shown in FIGS. 6A and 6B, the stator 20 is formed of the mold resin 20A and the stator core 70. The stator 20 has a columnar shape. The stator 20 has an outer circumferential side surface 21 extending continuously in the circumferential direction of the stator 20, a top surface 22 provided on the side from which a rotating force of the rotor 80 is outputted, and the bottom surface 23 provided on the opposite side from the top surface 22.

Here, a cavity to accommodate the rotor 80 (not shown in FIGS. 6A and 6B) is provided on the top surface 24 side. On the other hand, the bottom surface of the stator 20 is covered by the mold resin 20A, on the bottom surface 25 side.

As described above, the stator 20 has a cavity to accommodate the rotor 80, and one end of the cavity is covered by the mold resin 20A. In Embodiment 1, the mold resin 20, which covers the one end of the cavity to accommodate the rotor 80, corresponds to the bottom surface 25.

(Assembly of Case and Stator Core)

An assembly of the case and the stator core according to Embodiment 1 will be described below with reference to the drawing. FIG. 7 is a view showing an assembly of the case 10 and the stator core 70 according to Embodiment 1. Note that the mold resin 20A is omitted in FIG. 7.

As shown in FIG. 7, the coils 75 are wound around the stator teeth 72 provided to the stator core 70, respectively. The stator teeth 72 are arranged along the inner peripheries (circumferences) of the stator yokes 73 and each have a shape protruded inwardly in a radial direction.

In addition, the stator core 70 includes the insulator 76. The insulator 76 has multiple grooves. The bus rings connected to the coils 75 are placed along the grooves (bus-ring holders) provided in the insulator 76 and are connected to the terminals 150.

(Structure of Rotor)

Figure 8:
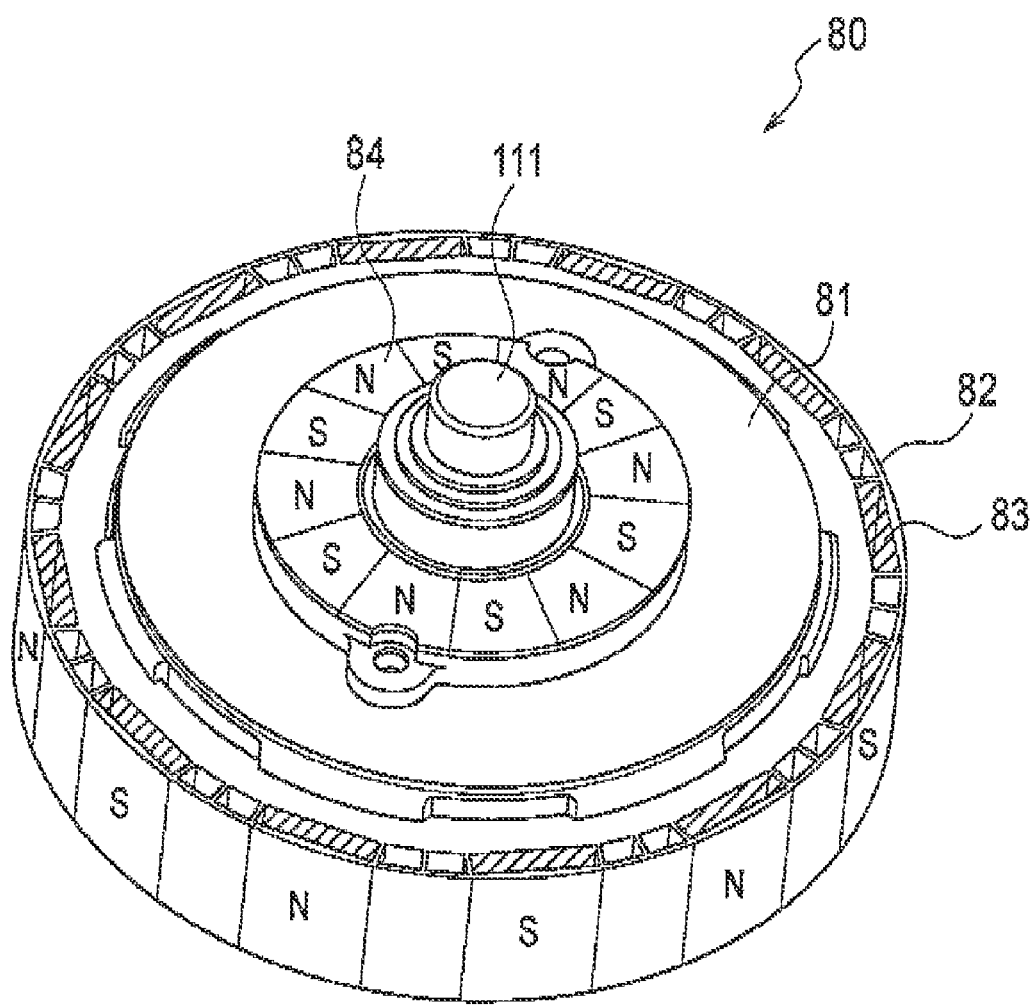
FIG. 8 is a perspective view showing a rotor 80 according to Embodiment 1.

The structure of the rotor according to Embodiment 1 will be described below with reference to the drawing. FIG. 8 is a perspective view showing the rotor 80 according to Embodiment 1.

As shown in FIG. 8, the rotor 80 includes a rotor holder 81, a rotor core 82, a rotor magnet 83, and a position detection magnet 84.

The rotor holder 81 is fixed to the rotary shaft 111 and is configured to hold the rotor core 82. The rotor core 82 is configured to hold the rotor magnet 83. The rotor magnet 83 is a set of magnets arranged around an outer circumferential portion of the rotor holder 81 in the circumferential direction of the rotor 80. The rotor 80 rotates by interaction between the rotor magnet 83 and the magnetic fields produced by the coils 75 (not shown in FIG. 8; see FIG. 7) provided to the stator core 70.

The position detection magnet 84 is a magnet provided to detect the position (rotation) of the rotor magnet 83 provided to the rotor 80. The position detection magnet 84 has a disk shape with a hole therein through which the rotary shaft 111 is inserted. Moreover, the position detection magnet 84 is placed adjacently to the rotor holder 81 in the axial direction of the rotary shaft of the rotor 80.

Thus, the position detection magnet 84 is placed, surrounding the rotary shaft 111. In addition, with the rotary shaft 111 as the center, the arrangement angle between any two adjacent poles of the position detection magnet 84 is equal to the arrangement angle between any two adjacent poles of the rotor magnet 83. Here, an arrangement angle is a central angle formed by a radius connecting the rotary shaft 111 and a first pole (e.g., S pole) and a radius connecting the rotary shaft 111 and a second pole (e.g., N pole), with the rotary shaft 111 as the center. The first and second poles are arranged alternately.

(Structure of Position Detecting Circuit Board)

Figure 9:
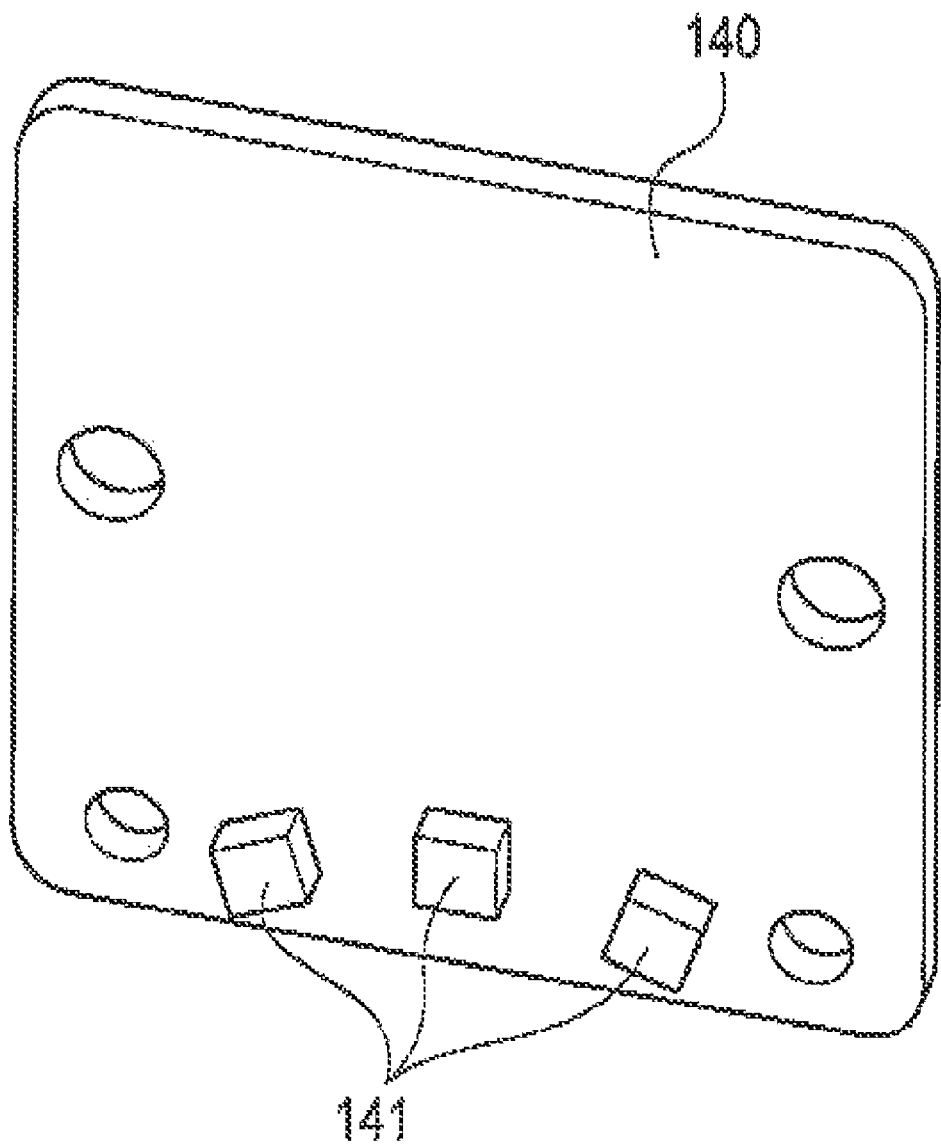
FIG. 9 is a view showing a position detecting circuit board 140 according to Embodiment 1.

The structure of the position detecting circuit board according to Embodiment 1 will be described below with reference to the drawing. FIG. 9 is a view showing the position detecting circuit board 140 according to Embodiment 1.

As shown in FIG. 9, the position detecting circuit board 140 has a plate shape. The position detecting circuit board 140 includes a position detecting element 141 configured to detect the magnetic field of the position detection magnet 84. The position detecting element 141 is a Hall element, for example.

The position detecting circuit board 140 includes multiple position detecting elements 141, for example. The interval between any two adjacent position detecting elements 141 of the multiple position detecting elements 141 is equal to the interval between the adjacent poles of the position detection magnet 84 described above. In addition, when the position detecting circuit board 140 is placed adjacently to the rotary shaft 111, the multiple position detecting elements 141 come to be arranged on a circle having the rotary shaft 111 as its center. In other words, when the position detecting circuit board 140 is placed adjacently to the rotary shaft 111, the multiple position detecting elements 141 come to be placed at positions adjacent to the position detection magnet 84 in the axial direction of the rotary shaft.

(Placement of Position Detecting Circuit Board (Summary))

Figure 10:
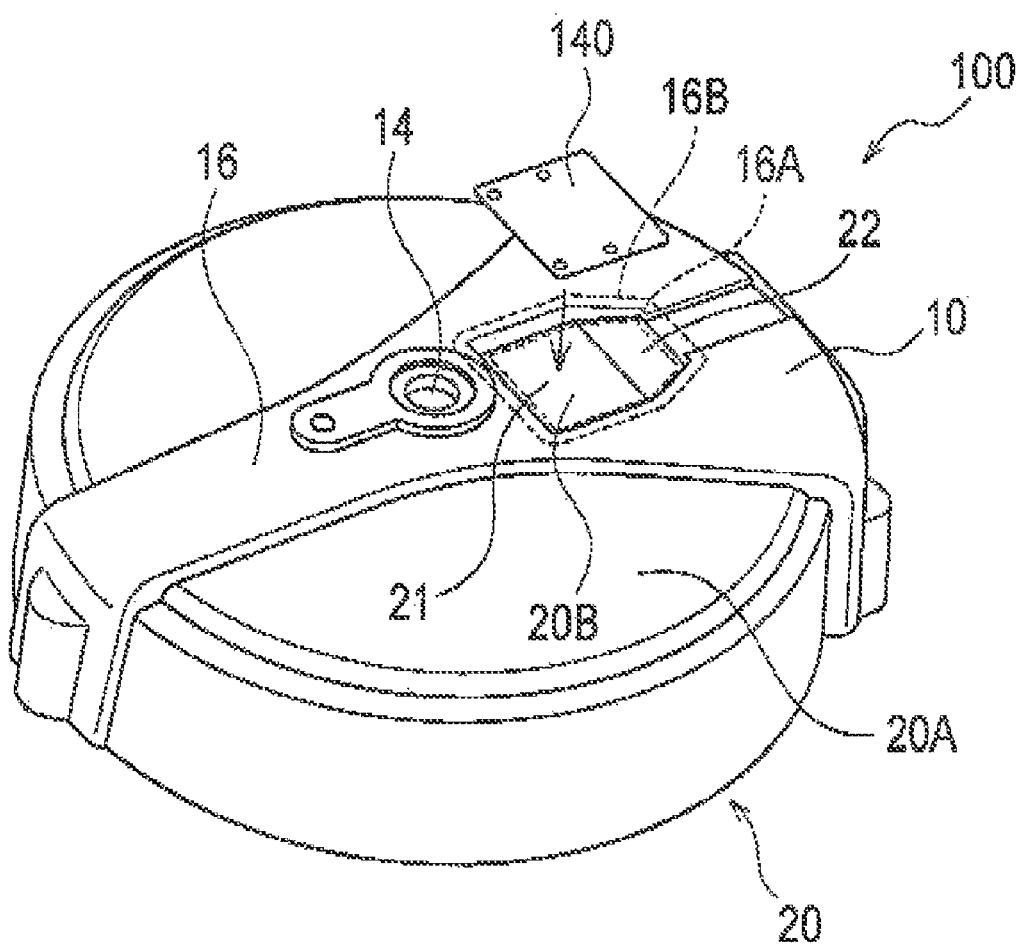
FIG. 10 is a view showing how the position detecting circuit board 140 according to Embodiment 1 is placed.
Figure 11:
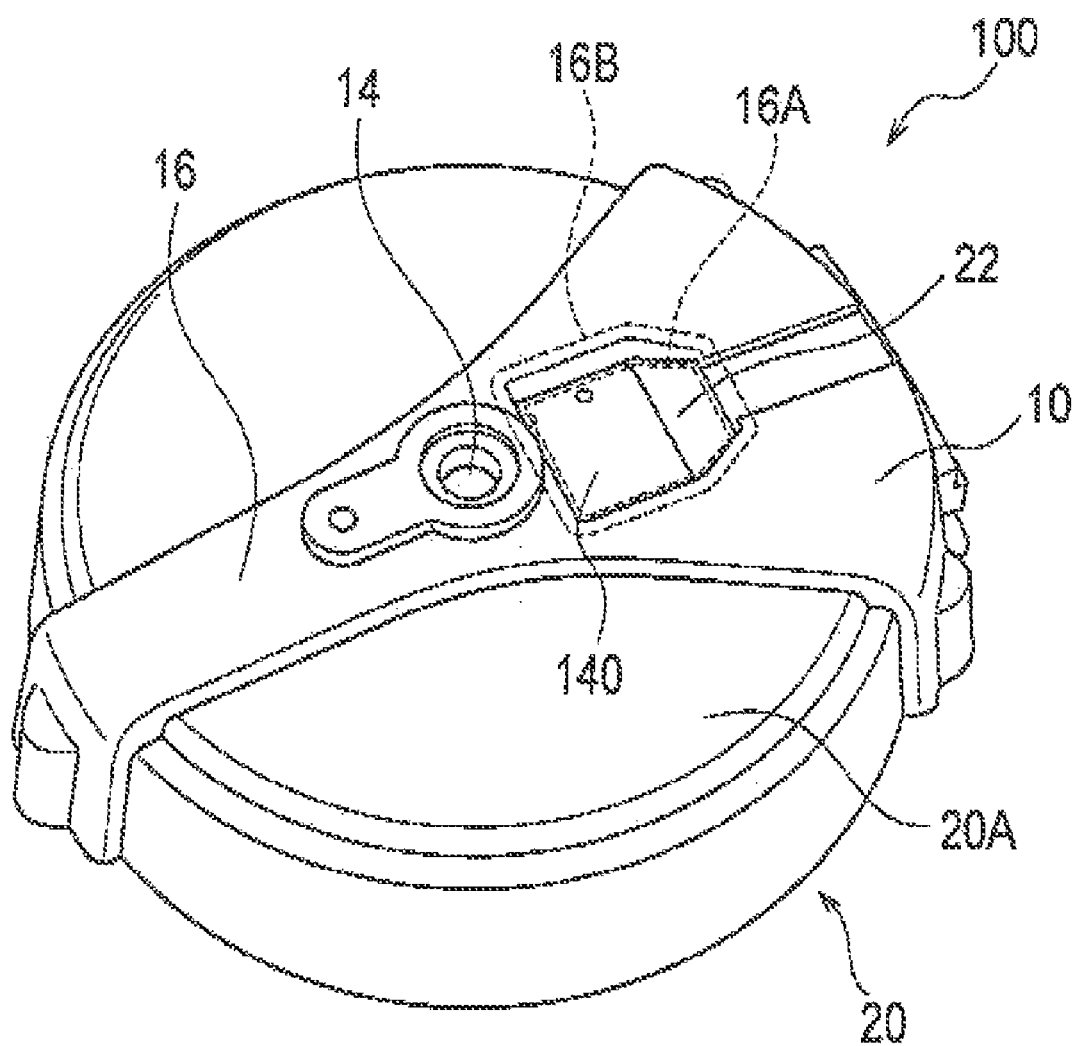
FIG. 11 is a view showing how the position detecting circuit board 140 according to Embodiment 1 is placed.

Placement of the position detecting circuit board (summary) according to Embodiment 1 will be described below with reference to the drawings. FIGS. 10 and 11 are views showing how the position detecting circuit board 140 according to Embodiment 1 is placed.

As shown in FIG. 10, the bottom surface portion 16 of the case 10 has a recessed portion 16B recessed toward the stator core 70. The aforementioned circuit-board placement region 16A is provided as the bottom of the recessed potion 16B.

Note that the circuit-board placement region 16A is an opening as described earlier. Hence, the mold resin 20A is exposed from the circuit-board placement region 16A. In other word, the mold resin 20A has an exposed portion 20B exposed from the circuit-board placement region 16A. The exposed portion 20B is provided in the bottom surface 25. That is, the exposed portion 20B is provided in the mold resin 20A covering the one end of the cavity used to accommodate the rotor 80.

The exposed portion 20B of the mold resin 20A has a circuit-board placement portion 21 to place the position detecting circuit board 140, and an adjacent portion 22 adjacent to the circuit-board placement portion 21.

As shown in FIG. 11, the position detecting circuit board 140 is mounted to the case 10 from an outer side of the case 10 in such a way to cover the circuit-board placement region 16A provided in the case 10. That is, the position detecting circuit board 140 is mounted to the case 10 in such a way to cover the circuit-board placement region 16A (opening).

Meanwhile, a circumferential portion of the position detecting circuit board 140 is sealed on the bottom of the recessed portion 16B with a sealing material. Alternatively, the position detecting circuit board 140 may be subjected to potting using urethane or the like. The position detecting elements 141 provided to the position detecting circuit board 140 are placed in a space formed between the circuit-board placement portion 21 and the position detecting circuit board 140. This space formed between the circuit-board placement portion 21 and the position detecting circuit board 140 is an enclosed space since the position detecting circuit board 140 is sealed on the bottom of the recessed portion 16B with the sealing material.

When the position detecting circuit board 140 is placed in the circuit-board placement region 16A, the multiple position detecting elements 141 come to be placed at positions adjacent to the position detection magnet 84 in the axial direction of the rotary shaft. Accordingly, it is apparent that the circuit-board placement region 16A includes a region which is adjacent to the position detection magnet 84 in the axial direction of the rotary shaft. Similarly, it is apparent that the circuit-board placement portion 21 of the mold resin 20A includes a portion which is adjacent to the position detection magnet 84 in the axial direction of the rotary shaft.

(Placement of Position Detecting Circuit Board (Detail))

Figure 12:
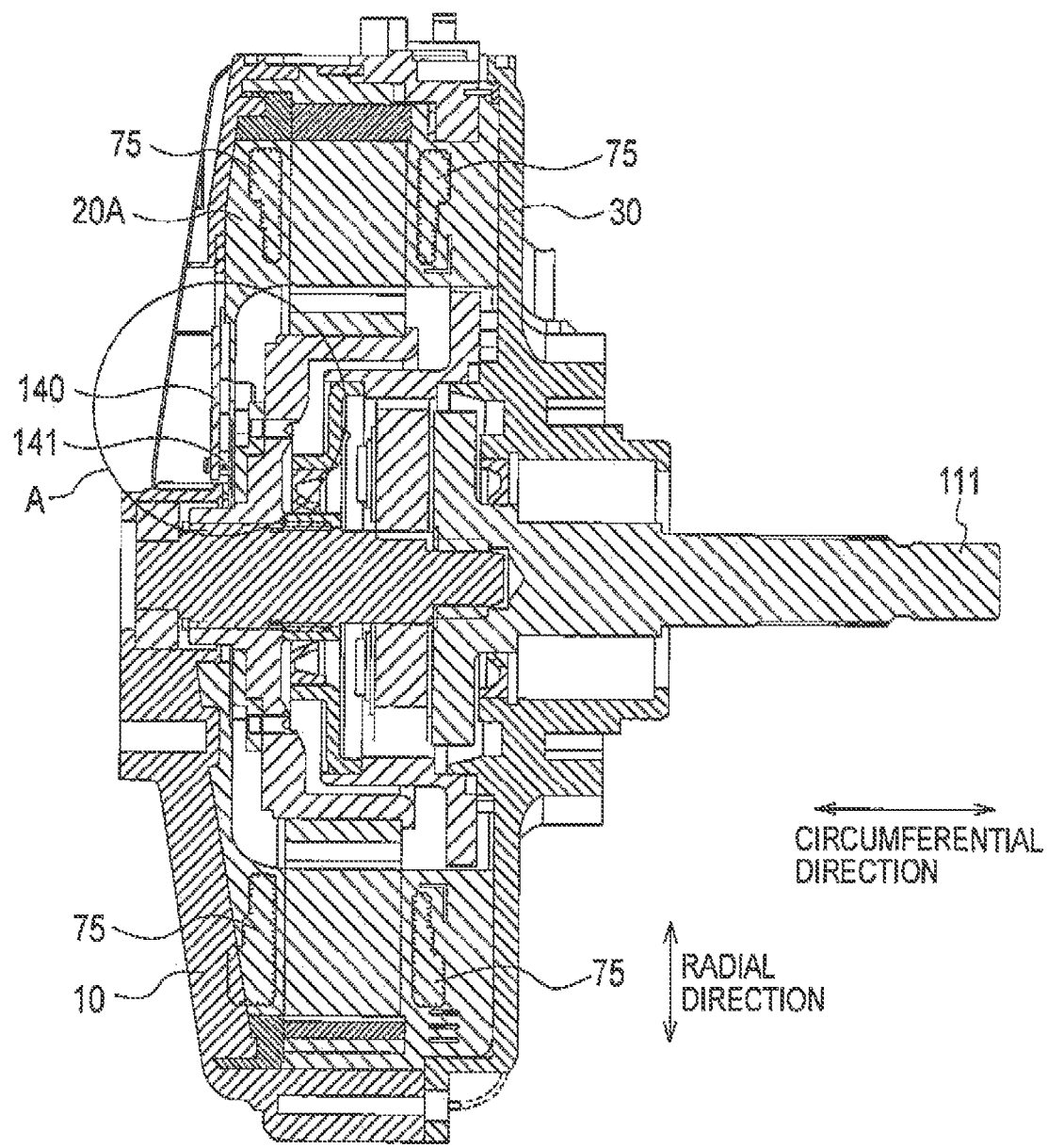
FIG. 12 is a cross-sectional view of the electric motor 100 according to Embodiment 1.
Figure 13:
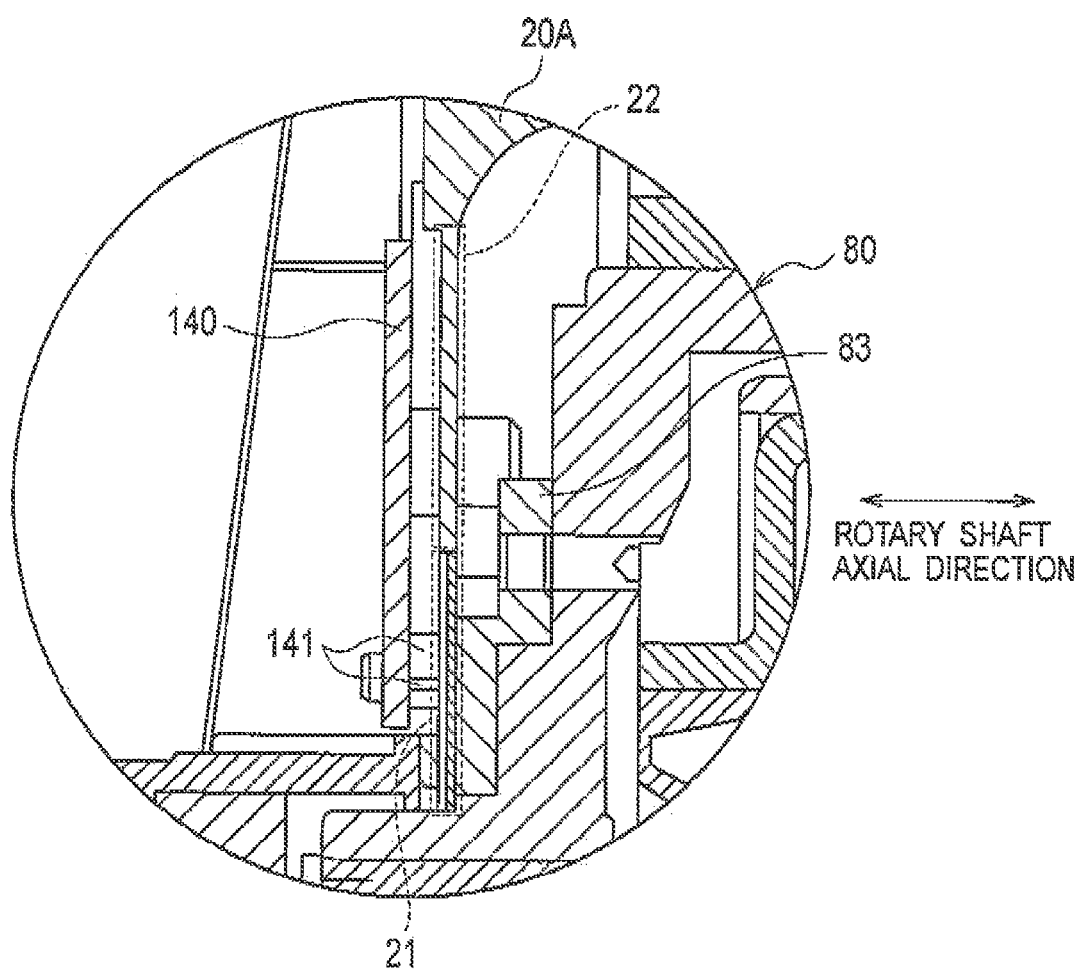
FIG. 13 is a cross-sectional view of the electric motor 100 according to Embodiment 1.

Placement of the position detecting circuit board (detail) according to Embodiment 1 will be described below with reference to the drawings. FIGS. 12 and 13 are cross-sectional views of the electric motor 100 according to Embodiment 1. FIG. 13 is an enlarged view of a region A shown in FIG. 12.

As shown in FIGS. 12 and 13, the position detecting circuit board 140 is isolated from the rotor 80 by the mold resin 20A (the exposed portion 20B).

Here, the circuit-board placement portion 21 is thinner in thickness in the axial direction of the rotary shaft of the rotor 80 than the adjacent portion 22 is. This forms the space to place the position detecting elements 141 between the circuit-board placement portion 21 and the position detecting circuit board 140.

As described above, the circumferential portion of the position detecting circuit board 140 is sealed on the bottom of the recessed portion 16B of the case 10 with the sealing material. That is, the position detecting elements 141 provided to the position detecting circuit board 140 are placed in an enclosed space.

The circuit-board placement region 16A (opening) is provided on the bottom surface 25 side of the mold resin 20A which covers the bottom surface of the stator 20. That is, the exposed portion 20B is provided on the bottom surface 25 side which covers the bottom surface of the stator 20.

(Advantageous Effects)

According to Embodiment 1, the position detecting circuit board 140 provided with the position detecting elements 141 is placed on an opposite side of the mold resin 20A from the rotor 80, the mold resin 20A covering the one end of the cavity provided in the stator 20. This allows the position detecting circuit board 140 to be repaired or replaced easily.

According to Embodiment 1, the position detecting circuit board 140 with the position detecting elements 141 is mounted to the case 10 from an outer side of the case 10. This allows the position detecting circuit board 140 to be repaired or replaced easily.

In Embodiment 1, the position detecting circuit board 140 with the position detecting elements 141 is mounted to the case 10 in such a way to cover the circuit-board placement region 16A (opening) provided in the case 10. Thus, position detection of the rotor 80 is not hindered by the case 10, and thereby the detection accuracies of the position detecting elements 141 are improved.

In Embodiment 1, the position detecting elements 141 are isolated from the rotor 80 by the mold resin 20A. This makes it possible to prevent the position detecting elements 141 from being damaged by lubricating oil or the like from the rotor 80 side. That is, the structure prevents water from entering the inside of the motor from the outside thereof.

In Embodiment 1, the circuit-board placement portion 21 is thinner in thickness in the axial direction of the rotary shaft of the rotor 80 than the adjacent portion 22 is. This forms the space to place the position detecting elements 141 between the circuit-board placement portion 21 and the position detecting circuit board 140. Specifically, it is possible to secure the space to place the position detecting elements 141 while inhibiting degradation of the heat radiation property of the adjacent portion 22 adjacent to the circuit-board placement portion 21, as well as inhibiting an increase in size of the electric motor 100 in the axial direction of the rotary shaft of the rotor 80. In addition, the distance between each position detecting element 141 and the position detection magnet 84 is made smaller, whereby the accuracy of the position detection is improved.

In Embodiment 1, the bottom of the recessed portion 16B is sealed by the position detecting circuit board 140 with the sealing material. This makes the space, which is formed between the circuit-board placement portion 21 and the position detecting circuit board 140, an enclosed space. That is, placed in an enclosed space, the position detecting elements 141 can be inhibited from being deteriorated.

In Embodiment 1, the position detection magnet 84 has a disk shape and is placed adjacently to the rotor 80 in the axial direction of the rotary shaft of the rotor 80. This makes it possible to inhibit an increase in size of the electric motor 100 in the radial direction of the stator core 70.

[Embodiment 2]

(Structure of Electric Motor Vehicle)

Figure 14:
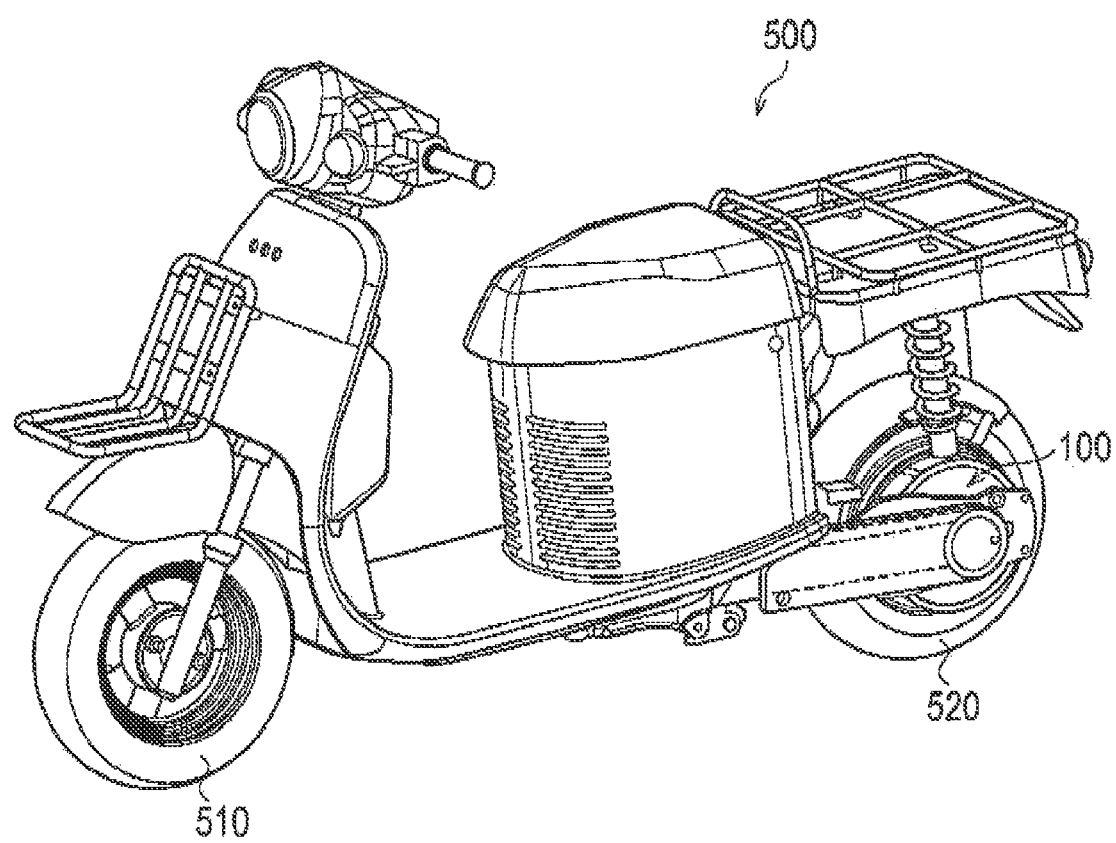
FIG. 14 is a view showing an example of an electric motor vehicle 500 according to Embodiment 2.

An electric motor vehicle according to Embodiment 2 will be described below with reference to the drawing. FIG. 14 is a view showing an example of an electric motor vehicle 500 according to Embodiment 2.

As shown in FIG. 14, the electric motor vehicle 500 is a motorcycle including a front wheel 510 and a rear wheel 520. Here, the rear wheel 520 is provided with the electric motor 100 and is a drive wheel.

Note that the electric motor vehicle 500 provided with the electric motor 100 is not limited to a motorcycle. For example, the electric motor vehicle 500 may be a three-wheeled vehicle or a four-wheeled vehicle.

[Other Embodiments]

The present invention has been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

In the aforementioned embodiments, the position detecting elements 141 provided to the position detecting circuit board 140 detect the magnetic fields of the position detection magnet 84; however, the embodiments are not limited to this. For example, the rotor 80 does not have to include the position detection magnet 84. In such case, the position detecting elements 141 detect the magnetic fields of the rotor magnet 83.

Although not particularly mentioned in the aforementioned embodiments, a circuit-board cover configured to cover the circuit-board placement region 16A may be mounted to the case 10 in order to protect the position detecting circuit board 140 placed in the circuit-board placement region 16A of the case 10.

In the aforementioned embodiments, the position detecting circuit board 140 is mounted to the case 10 in such a way to cover the circuit-board placement region 16A (opening); however, it should be noted that the position detecting circuit board 140 does not have to cover the whole circuit-board placement region 16A (opening).

In the aforementioned embodiments, the electric motor 100 includes the case 10 and the cushioning member 30; however, the embodiments are not limit to this. For example, the electric motor 100 does not have to include the case 10 or the cushioning member 30.

In the aforementioned embodiments, the position detecting circuit board 140 is placed in the circuit-board placement region 16A (opening) provided to the case 10; however, the embodiments are not limited to this. Specifically, the position detecting circuit board 140 may only be placed on an opposite side of the mold resin 20A from the rotor 80, the mold resin 20A covering the one end of the cavity formed in the stator 20 to accommodate the rotor 80. For example, depending on the shape of the case 10, the position detecting circuit board 140 may be placed at a portion where the case 10 is not present.

Although not particularly mentioned in the embodiments, it should be noted that in a process of molding the stator 20 with the mold resin 20A, the one end of the cavity formed in the stator 20 to accommodate the rotor 80 can be covered by the mold resin 20A.

What is claimed is:

1. An electric motor comprising:
   a case;
   a stator of columnar shape including a stator core of annular shape and mold resin molding the stator core accommodated by the case, the stator core accommodating a rotor configured to rotate about a rotary shaft; and
   a position detecting circuit board including a position detecting element configured to detect a position of the rotor, wherein
   the stator has a cavity for accommodating the rotor,
   one end of the cavity is covered by the mold resin with an exposed portion exposed from an opening provided in the case, and
   the position detecting circuit board is provided on the exposed portion and located at an opposite side from the rotor across the mold resin covering the one end of the cavity, wherein
   the exposed portion has a circuit-board placement portion to place the position detecting circuit board, and an adjacent portion adjacent to the circuit-board placement portion,
   the thickness of the circuit-board placement portion is thinner than the thickness of the adjacent portion in a direction of the rotary shaft, and
   a space to place the position detecting element is formed between the position detecting circuit board and the circuit-board placement portion.

2. The electric motor according to claim 1, wherein the position detecting element detects magnetic fields of rotor magnets provided around an outer circumferential portion of the rotor.

3. The electric motor according to claim 1, further comprising a position detection magnet provided adjacently to the rotor in a direction of the rotary shaft, wherein
   the position detecting element detects a magnetic field of the position detection magnet.

4. An electric motor vehicle comprising the electric motor according to claim 1.

5. An electric motor vehicle comprising the electric motor according to claim 2.

6. An electric motor vehicle comprising the electric motor according to claim 3.

* * * * *